United States Patent [19]

Bode

[11] Patent Number: 4,920,155

[45] Date of Patent: Apr. 24, 1990

[54] ORGANOMINERAL FOAMED MATERIALS AND PROCESSES FOR THEIR PREPARATION

[75] Inventor: Harald Bode, Kamen, Fed. Rep. of Germany

[73] Assignee: F. Willich Berg-und Bautechnik GmbH & Co., Fed. Rep. of Germany

[21] Appl. No.: 76,305

[22] Filed: Jul. 22, 1987

[30] Foreign Application Priority Data

Jul. 25, 1986 [DE] Fed. Rep. of Germany ....... 3625278

[51] Int. Cl.$^5$ ............................................. C08G 77/00
[52] U.S. Cl. .................................... 521/154; 521/155; 521/168; 521/173; 521/174
[58] Field of Search ............... 521/128, 129, 154, 155, 521/168, 173, 174

[56] References Cited

U.S. PATENT DOCUMENTS

| | | | |
|---|---|---|---|
| 3,629,308 | 12/1971 | Bailey et al. | 556/445 |
| 4,142,030 | 2/1979 | Dieterich et al. | 521/100 |
| 4,146,509 | 3/1979 | Markusch et al. | 521/115 |

FOREIGN PATENT DOCUMENTS

| | | |
|---|---|---|
| 0172337 | 2/1986 | European Pat. Off. |
| 1229290 | 4/1965 | Fed. Rep. of Germany |
| 2359609 | 11/1973 | Fed. Rep. of Germany |
| 2460834 | 12/1974 | Fed. Rep. of Germany |
| 2559255 | 12/1975 | Fed. Rep. of Germany |

OTHER PUBLICATIONS

Kollmeir, H. J. et al., Goldschmidt Informiert No. 58 (1983) (A partial unverified translation is also included).

*Primary Examiner*—John Kight
*Assistant Examiner*—S. A. Acquah
*Attorney, Agent, or Firm*—Saidman, Sterne, Kessler & Goldstein

[57] ABSTRACT

The subject-matter of the invention are organomineral foamed materials and a process for their preparation by reacting polyisocyanate and water-glass without the use of a foaming agent. In the process according to the invention the foaming of the reaction mixture is achieved in controlled manner by means of the $CO_2$ released in the reaction of isocyanate groups with water by the addition of a polysiloxane and polyether block copolymer.

8 Claims, No Drawings

ORGANOMINERAL FOAMED MATERIALS AND PROCESSES FOR THEIR PREPARATION

FIELD OF THE INVENTION

The invention relates to organomineral foamed materials and to a process for their preparation by reacting polyisocyanates and aqueous alkali silicate solutions (water-glass) without the addition of physical foaming agents.

BACKGROUND OF THE INVENTION

From De-A-24 60 834 there is known a non-flammable organomineral foam which essentially comprises a reaction product of water-glass and a compound exhibiting at least two isocyanate groups, as well as a process for its preparation. In this process a water-glass solution is reacted with a compound exhibiting at least two isocyanate groups in the presence of one or more catalysts and one or more volatile substances as foaming agent(s). The catalysts used are amines and amino-alcohols known as inductors from polyurethane chemistry, 2,4,6-tris(dimethylaminomethyl)phenol being preferred. The volatile substances acting as "physical" foaming agents are liquids which evaporate while the water-glass is reacting with the isocyanate because of the heating effect produced. Examples thereof are monofluorotrichloromethane, dichlorodifluoromethane and trichlorotrifluoroethane.

In the process known from DE-A-24 60 834 there may be admixed as further additives polysiloxane-based silicone oils to adjust the cell structure, surface-active substances that simultaneously act as foam stabilisers, and flame-inhibiting additives.

The known process makes careful use of foaming agents to prepare foams of low apparent density (less than 100 kg/m$^3$), haloalkanes such as trichlorofluoromethane being added, which are essentially responsible for the foaming of the reaction mixture. The carbon dioxide produced during the reaction of polyisocyanate and water-glass when a suitable NCO/Me$_2$O ratio (>2) is set escapes uncontrolled in the known process and therefore is not available, or only to a negligible extent, for foam formation (Me in Me$_2$O stands for an alkali metal atom).

The use of haloalkanes as physical foaming agent required under the known process is undesirable from environmental aspects. Also, the organomineral foamed products obtained by the conventional process contain residual foaming agent in their closed cells which is released to the atmosphere with the lapse of time, this being undesirable, too. Hence, there is a need for a process to prepare organomineral foams (mixed organic/inorganic foamed materials) that can be carried out without the use of specially admixed foaming agents.

It is an object of the invention to provide novel organomineral foamed materials which do not contain residual foaming agents such as haloalkanes.

It is a further object of the invention to provide a novel process for the production of organomineral foamed materials which process is carried out without the use of physical foaming agents.

It is a further object of the invention to provide a novel process for the production of organomineral foamed materials which process is carried out without the use of physical foaming agents and which results in foamed organomineral products with defined and reproducible density, the products being free of residual foaming agents.

SUMMARY OF THE INVENTION

The objects underlying the invention are solved by the surprising finding that by suitably formulating the reaction mixture to include certain hydrophobic polysiloxane and polyether block copolymers it is possible to render the CO$_2$ produced by reacting isocyanate groups and water useful in controlled foaming whereby a foamed material is produced which is free of undesirable foaming agents.

In accordance with the invention there are provided organomineral foamed materials obtained by reacting in the presence of a catalyst a polyisocyanate with an alkali silicate solution in a molar ratio of NCO groups in the polyisocyanate to Me$_2$O groups in the alkali silicate solution of >2 which products are characterized in that they contain at least 2% by weight, based on the total mass of the material, of a hydrophobic polysiloxane and polyether block copolymer of general formula I

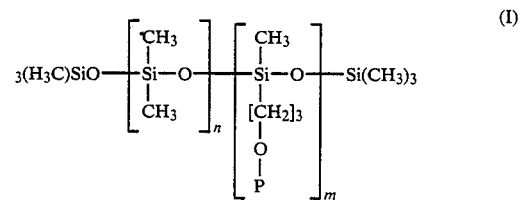

where P means a group of the formula

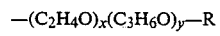

in which R represents a hydrogen atom or an alkyl group and n, m, x and y are integers giving the respective degree of polymerisation, the polysiloxane block being linked to the polyether block by a non-hydrolysable SiC bond and the proportion of ethylene oxide units in the polyether block being 30 to 80%.

The invention also provides a process for preparing organomineral foamed materials by reacting a polyisocyanate with an alkali silicate solution in the presence of a catalyst, which process is characterized by carrying out the reaction in a molar ratio of NCO groups in the polyisocyanate to Me$_2$O groups in the water-glass of >2 in the presence of a hydrophobic polysiloxane and polyether block copolymer of general formula I.

DETAILED DESCRIPTION OF THE INVENTION

It was found that surprisingly the carbon dioxide produced when isocyanate groups are reacted with water can be exploited in controlled manner to foam the reaction mixture if hydrophobic polysiloxane and polyether block copolymers are added to the reaction mixture. In addition to enhancing the emulsifying action, these substances both exert a nucleation effect on gas formation and stabilise the resulting foamed material. Their addition thus results in reproducible defined end-products, namely organomineral foams with poor combustibility. Addition of the polysiloxane and polyether block copolymers promotes the formation of CO$_2$ while the isocyanate groups react with the water-glass and at the same time the gas is prevented from escaping rapidly and uncontrolledly from the reaction mass.

By varying the amount of hydrophobic polysiloxane and polyether block copolymers the density of the end-products can be carefully adjusted. The pre-condition for the reaction to run as desired according to the invention is the observation of a molar ratio of NCO groups to $Me_2O$ component in the water-glass greater than 2, so that sufficient NCO groups are available in the first place to react with the water and thereby form $CO_2$.

The necessary ingredients of the reaction mixture for preparing the organomineral foamed materials with controlled density in accordance with the process of the invention are a water-glass solution, a polyisocyanate, a catalyst and a hydrophobic block copolymer of polysiloxane and polyether.

To prepare the organomineral foamed materials of the invention the aqueous alkali silicate solutions usually employed in the field may be used, for example the water-glass solutions described in EP-B-579 and DE-A-24 60 834. Sodium water-glasses are preferred on account of their ready availability, low viscosity and low cost.

Preferably water-glass solutions are used that have a relatively high solids content of 28 to 60, especially about 40 to 60 percent by weight of inorganic solids.

The molar ratio of $SiO_2$ to $Na_2O$ is advantageously in the range from 2.0 to 4.0, especially from 2.0 to 3.2.

If potassium water-glasses are used the molar ratio of $SiO_2$ to $K_2O$ is in the range from 2.8 to 4.1, preferably from 2.8 to 3.4. The solids content of the potassium water-glass is in the range from 28 to 45, preferably from 35 to 45 percent by weight.

As the isocyanate component aliphatic, cycloaliphatic, araliphatic, aromatic and heterocyclic polyisocyanates can be considered. The distillation residues produced in industrial isocyanate manufacture and which contain isocyanate groups may also be used.

The compounds specified in EP-B-579 and DE-A-24 60 834 are, for example, suitable. Also suitable are NCO prepolymers, as known from polyurethane manufacture and described in DE-A 24 60 834.

For practical reasons it is preferred to use the polyisocyanates readily available industrially, for example 2,3 and 2,6 toluylene diisocyanate, and any desired mixtures of these isomers ("TDI"), polyphenyl polymethylene polyisocyanates of the type manufactured by aniline-/formaldehyde condensation and subsequent reaction of the condensation product with phosgene (carbonyl chloride) ("crude MDI"), and polyisocyanates containing carbodiimide groups, urethane groups, allophanate groups, isocyanurate groups, urea groups or biuret groups ("modified polyisocyanates"). Especially preferred is "crude MDI" with an NCO content of 28 to 32.5%.

The third component required to prepare the organomineral foamed materials in accordance with the process of the invention is a catalyst. Catalysts known from polyurethane chemistry are suitable.

Examples of suitable catalysts are:

tertiary amines such as triethylamine, tributylamine, N-methylmorpholine, N-ethylmorpholine, N-cocomorpholine, N,N,N'N'-tetramethylethylene diamine, 1,4-diazabicyclo(2,2,2)octane, N-methyl-N'-dimethylaminoethylpiperazine, N,N-dimethylbenzylamine, bis-(N,N-diethylaminoethyl)adipate, N,N-diethylbenzylamine, pentamethyldiethylene triamine, N,N-dimethylcyclohexylamine, N,N,N',N'- tetramethyl-1,3-butane diamine, N,N-dimethyl-β-phenylethylamine, 1,2-dimethylimidazole, 2-methylimidazole and hexahydrotriazine derivatives;

silaamines with carbon-silicon bonds, as for example described in German Patent 12 29 290, e.g. 2,2,4-trimethyl-2-silamorpholine and 1,3-diethylaminomethyl-tetramethyldisiloxane; bases containing nitrogen, such as tetraalkylammonium hydroxides, alkali metal hydroxides such as sodium hydroxide, alkali metal phenolates such a sodium phenolate or alkali metal alcoholates such as sodium methylate; organo-metallic compounds, especially organic tin compounds, preferably tin(II) salts of carbonic acids, such as tin(II) acetate, tin(II) octoate, tin(II) ethylhexoate and tin(II) laurate, and the dialkyl stannic salts of carbonic acids, such as dibutyl tin diacetate, dibutyl tin dilaurate, dibutyl tin maleate or dioctyl tin diacetate;

catalysts that catalyse the addition reactions and/or the polymerisation or trimerisation of isocyanates, such as 2,4,6-tris(dimethylaminomethyl)phenol.

Catalysts preferably used in the process according to the invention are 2,4,6-tris(dimethylaminomethyl)phenol, dimethylcyclohexylamine and tetramethylhexamethylene diamine.

The catalyst is usually employed in the process of the invention in an amount of about 0.001 to 10, preferably 0.3 to 4.0 percent by weight, based on the amount of isocyanate.

The fourth component required to prepare the organomineral foamed materials according to the process of the invention is a "hydrophobic" polysiloxane and polyether block copolymer. The polysiloxane and polyether block copolymers have the general formula I

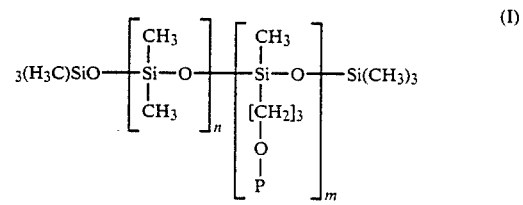

where P means a group of the formula

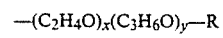

in which R represents a hydrogen atom or an alkyl group, preferably having 1 to 4 carbon atoms, and n, m, x and y are integers giving the respective degree of polymerisation.

The polysiloxane and polyether block copolymers of formula I and their use as stabilisers to manufacture polyurethane rigid foamed plastics are known; see H. J. Kollmeier et al, "Goldschmidt informiert" No. 58, 1983 (information material from the Goldschmidt company). In polyurethane foam manufacture these block copolymers are employed together with a foaming agent.

In the block copolymer employed in accordance with the invention the siloxane block is linked to the polyether block via a non-hydrolysable silicon-carbon bond. A further characteristic is the ratio of ethylene oxide to propylene oxide units in the polyether portion: the proportion of ethylene oxide groups is 30 to 80, preferably 50 to 75%. The terminal group of the polyether block is a hydrogen atom or an alkoxy group, the alkoxy group being preferred because of its stability in isocyanates.

The polysiloxane and polyether block copolymer employed under the invention is a "hydrophobic" polymer, the measure of its hydrophobic nature being the cloud point of a 4 percent aqueous solution. The block copolymers suitable under the invention exhibit a cloud point of not more than 60° C. The cloud point depends on the ethylene oxide content of the polyether block.

In the process according to the invention it is not necessary to add a "physical" foaming agent to the reaction mixture in order to prepare the inorganic and organic foamed materials. This means that the ecologically undesirable use of haloalkanes in foamed materials manufacture can be avoided.

Depending on the desired properties of the organomineral foamed materials, still further additives may be incorporated into the reaction mixture. These for example include nucleating substances, namely finely divided solids such as silicon dioxide or aluminium oxide, if desired in conjunction with zinc stearate, or amorphous silicic acid or metal silicates. Of these the preferred nucleating agent is the silicon dioxide precipitated from the colloidal water-glass solution.

In addition organic compounds may be added to the reaction mixture exhibiting radicals reactive to isocyanate groups, especially hydrogen atoms. Examples of these are polyalcohols (polyols) such as polyester polyols and polyether polyols and phosphate esters, e.g. tri-β-chloroethyl phosphonate or tri-β-isopropyl phosphonate, tertiary amines with active hydrogen atoms, such as triethanolamine, triisopropanolamine, N-methyl-diethanolamine, N-ethyl-diethanolamine, N,N-dimethylethanolamine and their reaction products with alkylene oxides, such as propylene oxide and/or ethylene oxide (these substances can simultaneously act as catalysts).

To reduce the flammability of the inorganic and organic foamed materials flame-inhibiting substances may be added to the reaction mixture in the process of the invention. The flame-inhibiting or flame-retardant substances known in the chemistry of plastics, such as phosphates and borates, are suitable for this. The proportion of flame-inhibiting substances may lie in the range 2 to 30 percent by weight, based on the isocyanate component.

Where the reaction components are processed mechanically the flame-inhibiting additive also serves to set given NCO/Me$_2$O ratios.

Furthermore aggregates and fillers that strengthen the foamed products may also be added to the reaction mixture. Examples of suitable fillers are diatomaceous earth, aluminium oxide hydrate, magnesium silicate, asbestos powder, chalk, asbestos fibres and fibre glass. The amount of fillers added is primarily determined by the viscosity of the mixture. It is preferably in the range from 0.1 to 30 percent by weight, based on the weight of the water-glass solution employed. Pigments or dyes may also be incorporated into the reaction mixture as desired.

To prepare the organomineral foamed materials two components A and B are preferably initially prepared in the process according to the invention. Component (A) is made up of the water-glass solution and contains the catalyst together with, as additives if desired, the organic compounds with hydrogen atoms active via-à-vis isocyanate groups, such as the polyol, as well as flame-inhibiting additives, fillers and dyes. If required, water may be added to component (A) to lower the viscosity. The water also acts as a reactant to produce the carbon dioxide.

Component (B) is made up of the polyisocyanate and the polysiloxane and polyether block copolymer. Component (B) too may contain aggregates and fillers compatible with the ingredients specified, along with others of the specified additives, e.g. flame-inhibiting additives such as tris-β-chloropropylphosphate or a hydrolysis-resistant flameproofing agent based on phosphorus and halogen.

To preare the organomineral foamed materials in accordance with the process of the invention components (A) and (B) are carefully blended. The start-up time of the mixtures obtained is generally between 5 and more than 100 seconds and can be regulated as desired. If required the components or the mixture may be heated or cooled in order to adapt the start-up time to the requirements.

If the mixture is adjusted to a composition such that the molar ratio of the NCO groups to the Me$_2$O groups in the water-glass is greater than 2 and preferably lies in the range from about 2.5 to 5, it is possible to prevent the excess carbon dioxide produced during the reaction from escaping uncontrolledly from the reaction mixture by adding the polysiloxane and polyether block copolymers of general formula I and using it for controlled foaming of the mixture and regulated, reproducible foam formation. For this the polysiloxane and polyether block copolymer must be employed in an amount of 3 to 50, preferably 7 to 45, more preferably 10 to 40 parts by weight, per 100 parts by weight of NCO groups.

In the process of the invention organomineral foamed materials with particularly low density can be obtained if a polymeric phosphate is added to the reaction mass according to a preferred embodiment. To obtain a determined density of the organomineral foamed material there is surprisingly required a smaller amount of polysiloxane and polyether blockcopolymers in this embodiment than in the embodiments in which no polymeric phosphate is used, ie. part of this copolymer can be dispensed with. The polymeric phosphate is added to the reaction mass in an amount of 20 to 150 parts by weight, based on the weight of 100 parts NCO groups, preferably in an amount of 60 to 120 parts by weight. A particular example of a suitable polymeric phosphate is potassium tripolyphosphate of the formula $K_5P_3O_{10}$ with a $P_2O_5$ content of 48% and a pH of 9.5.

The foams obtained upon addition of a polymeric phosphate are fine pored, they have a surprisingly high strength and look similar to polyurethane foams.

The organomineral foams of the invention differ from the known products, for instance from those obtained according to DE-A-2,460,834 in that they have a content of units derived from the polysiloxane and polyether block copolymers of formula I of at least 2% by weight, based on the total mass of the foam (total amount of solids, derived from polyisocyanate, waterglass, catalyst and block copolymer) and in that they are free of foaming agent residues (haloalkanes).

The content of foam stabilizers in the known products by contrast is at most about 1%. The upper limit of the content of the units derived from the block copolymer is not critical in the foams of the invention; from the point of view of economy and processing this content is preferably not higher than 10% by weight, since larger amounts of the block polymer are hardly used in the process for preparing the foamed materials.

The examples illustrate the invention, which, however, is by no means limited thereto.

EXAMPLE 1

Component A 126.76 g Na water-glass; 45% solids; mol SiO$_2$/mol Na$_2$O = 2.84
3.43 g 2,4,6-tris(dimethylaminomethyl)phenol (catalyst)
22.81 g water

Component B 110.7 g "crude MDI"; NCO content 30.5%
12.3 g polysiloxane and polyether block copolymer with terminal O-methyl groups (Tegostab B8407 from the Goldschmidt company, FRG).

The two components (mol NCO/N$_2$O = 3.27) are blended very thoroughly for 15 s at room temperature with a stirrer. light foamed material with a density of 59 kg m$^{-3}$ and a content of block copolymer-derived units of about 6.7% is obtained.

EXAMPLE 2

Component A 110.60 g water-glass as in Example 1
2.50 g catalyst as in Example 1
52.48 g water

Component B 124.00 g "crude MDI" as in Example 1
11.23 g polysiloxane and polyether block copolymer with terminal O-butyl groups (Tegostab B 2219 from Goldschmidt).

The components (mol NCO/Na$_2$O = 4.20) are processed as in Example 1. A foamed material with a density of 16 kg m$^{-3}$ and a content of block copolymer-derived units of about 6.0% is obtained.

EXAMPLE 3

Component A 107.80 g potassium water-glass; solids content 41.1%; SiO$_2$/K$_2$O = 2.87
2.20 g catalyst as in Example 1
22.00 g water

Component B 109.04 g "crude MDI" as in Example 1
6.96 g block copolymer as in Example 1

The components are processed as in Example 1. A foamed material with a density of 35 kg m$^{-3}$ and a content of block copolymer-derived units of about 4.3% is obtained.

EXAMPLE 4

Component A 112.13 g sodium water-glass 47/48; 43.3% solids; SiO$_2$/Na$_2$O = 2.69
2.29 g catalyst as in Example 1
22.88 g water

Component B 109.04 g "crude MDI" as in Example 1
6.96 g block copolymer as in Example 1.

The components are processed as in Example 1. A foam with a density of 27 kg m$^{-3}$ and a content of block copolymer-derived units of about 4.2% is produced.

EXAMPLE 5

Component A 126.10 g sodium water-glass 48/50
2.87 g catalyst as in Example 1
54.33 g water

Component B 124.0 g "crude MDI" as in Example 1
4.3 g block copolymer as in Example 1

The components are processed as in Example 1. A foam with a density of 63 kg m$^{-3}$ and a content of block copolymer-derived units of about 2.4% is produced.

EXAMPLE 6

Example 5 is repeated with the modification that 5.3 g of the block copolymer from Example 1 are added to component B. The result is a foam having a density of 46 kg m$^{-3}$ and a content of block copolymer-derived units of about 2.9%.

EXAMPLE 7

Example 5 is repeated with the modification that 9.3 g of the block copolymer from Example 1 are added to component B. The result is a foam having a density of 33 kg m$^{-3}$ and a content of block copolymer-derived units of about 5.0%.

EXAMPLE 8

Component A 88.33 g sodium water-glass 48/50
2.69 g catalyst as in Example 1
33.68 g water

Component B 94 g "crude MDI" as in Example 1
6 g block copolymer as in Example 1
20 g phosphorus and halogen-based flameproofing agent (Fyrol 2XC20 from Stauffer Chemicals)

The components (mol NCO/Na$_2$O = 3.58) are processed as in Example 1. A fine pored foamed material with a density of 26 kg m$^{-3}$ and a content of block copolymer-derived units of about 4.2% is obtained.

EXAMPLE 9

Component A 64.8 g sodium water-glass 48/50
0.5 g tetramethylhexamethylene diamine
22.2 g water

Component B 57.34 g "crude MDI" as in Example 1
3.66 g block copolymer as in Example 1

The components are processed as in Example 1. A foam with a density of 82 kg m$^{-3}$ and a content of block copolymer-derived units of about 4.1% is produced.

EXAMPLE 10

Example 1 is repeated with the modification that 118.8 g of "crude MDI" and 13.2 g of block copolymer are employed (NCO/Na$_2$O = 3.51). A foamed material having a density of 44 kg m$^{-3}$ and a content of block copolymer-derived units of about 6.9% is obtained.

EXAMPLE 11

Component A 33.3 g Na water-glass; 54.5% solids; mol SiO$_2$/mol Na$_2$O=2.09

26.7 g water 22 g potassium tripolyphosphate 8 g sodium polyphosphate (pH 8.6 at 1%; about 60.5% P$_2$O$_5$ content)

2.5 g catalyst as in Example 1

Component B 95 g "crude MDI" as in Example 1

5 g block copolymer as in Example 1

The components are processed as in Example 1. A fine pored, strong foamed material with a density of 27 kg/m$^3$ is obtained.

EXAMPLE 12

Component A 22 g Na water-glass as in Example 1

70 g potassium tripolyphosphate; 50% solution 2.5 g catalyst as in Example 1

1 g triton BG 10 (non ionogenic tenside 35% in water; Röhm & Haas)

Component B 95 g "crude MDI" as in Example 1

5 g block copolymer as in Example 1

The components are processed as in Example 1. A strong, fine pored foamed material with a density of 20 kg/m$^3$ is obtained.

EXAMPLE 13

Component A 30 g Na water-glass as in Example 1

40 g potassium tripolyphosphate; 50% solution 1 g tenside as in Example 12

2.5 g catalyst as in Example 1

Component B 95 g "crude MDI" as in Example 1

5 g block copolymer as in Example 1

The components are processed as in Example 1. A foamed material with a density of 15 kg/m$^3$ is obtained.

I claim:

1. A process for preparing organomineral foamed materials by reacting a polyisocyanate with an alkali silicate solution in the presence of a catalyst, characterized by carrying out the reaction in a molar ratio of NCO groups in the polyisocyanate to Me$_2$O groups in tha alkali silicate solution of >2 in the presence of a hydrophobic polysiloxane and polyether block copolymer of general formula I

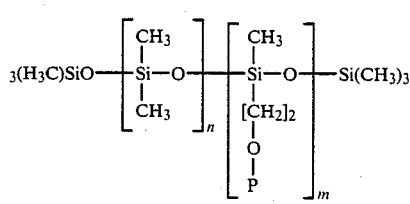

where P means a group of the formula

—(C$_2$H$_4$O)$_x$(C$_3$H$_6$O)$_y$—R in which R represents a hydrogen atom or an alkyl group and n, m, x and y are integers giving the respective degree of polymerization, the polysiloxane block being linked to the polyether block by a non-hydrolysable SiC bond and the proportion of ethylene oxide units in the polyether block being 30 to 80%; wherein the process is carried out without the addition of a physical foaming agent.

2. The process according to claim 1, characterised by employing the polyisocyanate and the alkali silicate solution in amounts such that the molar ratio NCO/Me$_2$O lies in the range 2.5 to 5.

3. The process according to claim 1, characterised by employing the polysiloxane and polyether block copolymer of general formula I in an amount from 3 to 40 parts by weight per 100 parts by weight of NCO groups in the polyisocyanate.

4. The process according to claim 1, characterised by using 2,4,6-tris(dimethylaminomethyl)phenol, dimethylcyclohexyl amine or tetramethylhexamethylene diamine as catalyst.

5. The process according to claim 1, characterised by employing a hydrophobic polysiloxane and polyether block copolymer that exhibits a cloud point of not more than 60° C. in 4% aqueous solution.

6. The process according to claim 1, characterised by reacting the polyisocyanate with the alkali silicate solution in the presence of a polymeric phosphate.

7. The process according to claim 1, characterised by using potassium tripolyphosphate as the polymeric phosphate.

8. A process for preparing organomineral foamed materials by reacting a polyisocyanate with an alkali silicate solution in the presence of a catalyst without the addition of a physical foaming agent wherein the reaction is carried out in a molar ratio of NCO groups in the polyisocyanate to Me$_2$O groups in the alkali silicate solution of >2 in the presence of a hydrophobic polysiloxane and polyether block copolymer of general formula I

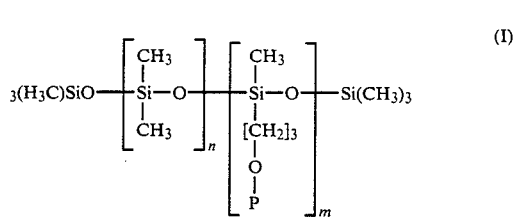

where P means a group of the formula

—(C$_2$H$_4$O)$_x$(C$_3$H$_6$O)$_y$—R in which R represents a hydrogen atom or an alkyl group and n, m, x and y are integers giving the respective degree of polymerisation, the polysiloxane block being linked to the polyether block by a non-hydrolysable SiC bond, the proportion of ethylene oxide units in the polyether block being 30 to 80%, and the block copolymer exhibiting a cloud point of not more thank 60° C. in 4% aqueous solution.

* * * * *